United States Patent [19] [11] 4,148,765
Nelson [45] Apr. 10, 1979

[54] POLYESTER RESINS CONTAINING DICYCLOPENTADIENE

[75] Inventor: Donald L. Nelson, Lake Jackson, Tex.

[73] Assignee: The Dow Chemical Company, Midland, Mich.

[21] Appl. No.: 864,974

[22] Filed: Dec. 27, 1977

Related U.S. Application Data

[63] Continuation-in-part of Ser. No. 758,095, Jan. 10, 1977, abandoned.

[51] Int. Cl.$^2$ .................. C08G 63/02; C08G 63/20
[52] U.S. Cl. .................. 260/22 CB; 260/22 M; 260/23 P; 260/40 R; 260/861; 428/430; 428/431
[58] Field of Search .............. 260/22 CB, 23 P, 40 R, 260/75 EP, 75 R, 78.4 EP, 861, 22 M; 428/430, 431

[56] References Cited

U.S. PATENT DOCUMENTS

| | | | |
|---|---|---|---|
| 2,404,836 | 7/1946 | Gerhart et al. | 260/22 CB |
| 2,689,232 | 9/1954 | Gerhart | 260/22 CB |
| 2,822,350 | 2/1958 | Hayes | 260/75 EP |
| 2,843,556 | 7/1958 | Moorman | 260/22 CB |
| 3,347,806 | 10/1967 | Zimmermann | 260/22 CB |
| 3,374,208 | 3/1968 | Seiner et al. | 260/22 EP |
| 3,629,169 | 12/1971 | Bedighian | 260/22 CB |
| 3,726,819 | 4/1973 | Dijkhuizen | 260/22 CB |
| 3,986,992 | 10/1976 | Canning et al. | 260/22 CB |
| 4,029,848 | 6/1977 | Nelson | 260/22 R |
| 4,045,392 | 8/1977 | Callahan et al. | 260/22 R |

Primary Examiner—Ronald W. Griffin
Attorney, Agent, or Firm—B. G. Colley

[57] ABSTRACT

Polyester resins are produced which are modified with $C_{10}$ hydrocarbon concentrate. They are superior to the known resins containing the hydrocarbon concentrate in that the dicarboxylic acid or anhydrides used in the preparation of the resins are hydrolyzed with water before or during the reaction of the hydrocarbon concentrate with the other resinous monomers.

8 Claims, No Drawings

POLYESTER RESINS CONTAINING DICYCLOPENTADIENE

CROSS REFERENCE TO RELATED APPLICATION

This application is a continuation-in-part of Ser. No. 758,095 filed Jan. 10, 1977, now abandoned.

BACKGROUND OF THE INVENTION

This invention relates to resins containing an effective amount of a $C_{10}$ hydrocarbon concentrate and molded products or coatings prepared from them.

More specifically, the invention relates to polyester resins and alkyd resins produced by reacting a polyol or an alkyene oxide, an olefinically unsaturated dicarboxylic acid or anhydride or a saturated polycarboxylic acid or anhydride, water, and an effective amount of a $C_{10}$ hydrocarbon concentrate.

It is well known from the report by P. L. Smith, et al. "The Use of Dicyclopentadiene in Polyesters", Proceedings of the 22nd Annual Technical Conference, S.P.I., Reinforced Plastics Division, Washington, D.C. (1967) and the article by R. Zimmerman, et al. "Modification of Unsaturated Polyesters with Dicyclopentadiene", Fette-Seifen-Anstrichmittel 66, #9, 670–678 (1964), and U.S. Pat. No. 3,347,806 that polyesters can be modified with a concentrated dicyclopentadiene extract. In Ser. No. 651,325 filed Jan. 21, 1976, now U.S. Pat. No. 4,029,848 applicant disclosed the preparation of modified polyesters wherein the dicyclopentadiene used is a less pure concentrate.

SUMMARY OF THE INVENTION

It has now been found that resins modified with $C_{10}$ hydrocarbon concentrates can be prepared using water during the reaction sequence and surprisingly, the resins thus prepared are better than those prepared without the use of water in that the resins are more reactive and thus cure or harden faster and have better heat distortion temperatures.

The resins of this invention are prepared by reacting
(A) a reactant selected from the group consisting of
  (1) an alpha, beta ethylenically unsaturated dicarboxylic acid or its anhydride, or mixtures thereof,
  (2) a saturated polycarboxylic acid or the anhydride thereof,
  (3) mixtures of (1) and (2),
(B) about 0.03 to about 10 moles of water per mole of carboxylic acid or anhydride;
(C) about 0.05 mole to about 1.0 mole of a $C_{10}$ hydrocarbon concentrate per mole of carboxylic acid or anhydride, and
(D) a polyol or an alkylene oxide with the proviso that when (D) is an alkylene oxide of 2–4 carbons, (A) is at least 90% by weight of a dicarboxylic acid anhydride, and when (D) is a polyol and (A) is a polycarboxylic acid or anhydride, there can be present 0–25% by weight based on the total weight of the polycarboxylic acid or anhydride of
  (E) a monohydric alcohol having 3–18 carbon atoms,
  (F) a fatty acid or oil having up to 22 carbon atoms,
  (G) a monocarboxylic aromatic acid, or
  (H) mixtures of (E), (F) or (G).

A preferred aspect of this invention are the unsaturated polyesters prepared by reacting
(A) a reactant selected from the group consisting of
  (1) an alpha, beta ethylenically unsaturated dicarboxylic acid anhydride,
  (2) mixtures of (1) with 1–90% by weight of a saturated polycarboxylic acid or the anhydride thereof,
  (3) mixtures of (1) with a mixture of a saturated polycarboxylic acid and an anhydride of a saturated polycarboxylic acid,
(B) about 0.03 to about 10 moles of water per mole of dicarboxylic acid or anhydride,
(C) about 0.05 mole to about 1.0 mole of a $C_{10}$ hydrocarbon concentrate per mole of carboxylic acid or anhydride, and
(D) a polyol.

A related aspect of this invention is the cross-linkable mixture of the above polyester resin with an olefinically unsaturated monomer such as styrene and a fibrous laminate which has been impregnated and cured with the above mixture.

DESCRIPTION OF THE PREFERRED EMBODIMENTS

The polyols used to prepare the resins of this invention are those which are reactive with acids and/or anhydrides and may include, for example, ethylene glycol, propylene glycol, diethylene glycol, dipropylene glycol, butanediol, hexanediol, pentaerythritol, triethylene glycol, trimethylol propane, glycerol, or mixtures thereof. Preferably, the polyols used in this invention are glycols such as ethylene glycol, propylene glycol, and/or dipropylene glycol and/or diethylene glycol.

The unsaturated dicarboxylic acids or anhydrides that can be used include maleic, fumaric, mesaconic, itaconic, citraconic and the like or mixtures thereof.

Conventional saturated polybasic acids useful to prepare these resins include, for example, orthophthalic anhydride or acid, terephthalic acid, isophthalic acid, trimellitic anhydride, adipic acid, sebacic acid, succinic acid and the like acids or anhydrides.

The $C_{10}$ hydrocarbon concentrate used in this invention is a commerical product generally prepared by dimerizing a crude $C_5$ stream from the cracking of crude mixtures of hydrocarbons as set forth by Gebhart, et al. in U.S. Pat. No. 3,557,239 issued Jan. 19, 1971.

These concentrates have as the main reactive components about 60 to about 90 percent by weight of dicyclopentadiene, about 5 to about 30 percent by weight of the mixed Diels-Alder dimers of diolefins such as butadiene, cis and trans piperylene, isoprene, cyclopentadiene, and methyl cyclopentadiene. The remainder of these concentrates generally comprise benzene, cyclopentene, 1,5-hexadiene and oligomers of the above diolefins.

Examples of some of the dimers which have been identified in these concentrates are the Diels-Alder adducts of two moles of isoprene (isoprene dimers), the adduct of cyclopentadiene and isoprene, the adduct of cyclopentadiene and piperylene, and the like.

If desired, relatively pure dicyclopentadiene (90–100%) can be used herein.

The polyesters are prepared by reacting in a nitrogen atmosphere about one mole of an alpha, beta ethylenically unsaturated dicarboxylic acid or its anhydride or mixtures of both with a polyol. The unsaturated dicarboxylic acid or anhydride can be totally replaced with a saturated polycarboxylic acid or anhydride if saturated esters are desired or can be partially replaced with the saturated polycarboxylic acid or anhydride.

The reaction is carried out in the presence of about 0.03 to about 10 moles water per mole of carboxylic acid anhydride used. The preferred range is about 0.05 to about 3 moles water per mole of carboxylic acid anhydride.

The reactants such as acid or anhydride, polyol and water can be heated to a temperature range from about 25° C. to 140° C. prior to the addition and reaction of the dicyclopentadiene.

However, this is optional since essentially the same results are obtained if all the reactants are heated with water to about the same temperature range for about the same time period.

While the reaction of $C_{10}$ hydrocarbon and carboxylic acid will occur at temperatures as low as 50° C., it is sometimes desirable to heat the reaction mixture to a temperature range from about 100° C. to about 140° C. after the addition of dicyclopentadiene to insure the complete reaction thereof.

If desired, the use of a polyol can be eliminated if at least 90% of a dicarboxylic anhydride is used as a component of the reactants. In this instance the reaction of the polycarboxylic acid which may be created by the addition of water, and the $C_{10}$ hydrocarbon is allowed to proceed to near completion before an alkylene oxide having 2-4 carbon atoms such as ethylene oxide, propylene oxide or butylene oxide is added to the reactants in a known manner.

The technique of preparing polyesters from anhydrides and alkylene oxides is generally known from U.S. Pat. Nos. 3,374,208 and 2,822,350.

If desired these particular polyesters can be further modified by incorporating into the reaction mixture 0–25% by weight based on the total weight of polycarboxylic acid or anhydride of a monohydric alcohol having 3–18 carbon atoms, a fatty acid or oil having up to 22 carbon atoms, a mono-carboxylic aromatic acid, or mixtures thereof.

Examples of suitable monohydric alcohols are butanol, propanol, allyl alcohol, and stearyl alcohol.

Examples of suitable fatty acids are caproic, lauric, palmitic, stearic, etc. as well as the unsaturaed fatty acids such as oleic, linoleic, ricin oleic, etc.

Examples of fatty oils are linseed oil, soybean oil, tall oil and fish oil.

Examples of suitable monocarboxylic aromatic acids are benzoic acid and tertiary butyl benzoic acid.

After this initial reaction, the reaction is heated to about 180° C. to about 250° C. and preferably 190° C. to 205° C. with a removal of the water of condensation by a Dean Stark trap until the acid number reaches about 30 to about 35.

The resin is then recovered and blended with an ethylenically unsaturated monomer copolymerizable with the unsaturated polyester polymers to form a blend wherein the weight ratio of polyester to monomer is in the range from about 4:1 to about 1:2. Such ethylenically unsaturated monomers are well known and include: styrene, methyl styrene, chlorostyrene, vinyl toluene, divinyl benzene, vinyl acetate, acrylic and methacrylic acid, diallyl phthalate and like unsaturated monomers or mixtures thereof.

These polyester blends with unsaturated monomers should contain about 20 to about 60 percent by weight and preferably 30-50 percent by weight of the monomers based on the weight of the polyester. A small amount of an inhibitor such as tertiary butyl catechol, hydroquinone, or the like may be added to this mixture.

The final blend is a crosslinkable polyester composition which is useful to make laminates, castings or coatings.

The laminates of this invention are made by mixing into the crosslinkable composition free radical forming catalysts in known amounts and adding this mixture to a suitable fibrous reinforcement such as asbestos fibers, carbon fibers, fibrous glass, or inorganic fibers.

Examples of these catalysts are benzoyl peroxide, tertiary butyl peroxide, methylethyl ketone peroxide and the like. It is frequently of value to add accelerators such as cobalt naphthenate, dimethyl aniline, and the like.

The polyester resin is rolled, sprayed or impregnated into the fibrous reinforcement such as fibrous glass and cured in a manner well known in the art. When fibrous glass is used, it can be in any form such as chopped strands, filaments, glass ribbons, glass yarns, or reinforcing mats.

The alkyd resins may be compounded with solvents pigments or other resinous products and cured to form useful coatings in a known manner.

The following examples are presented to illustrate but not limit the invention.

EXAMPLE 1

To a reaction flask equipped with a stirrer, heating coil with controller, thermowell, nitrogen sparge tube, and a reflux condenser were added:

174.1 gms (1.775 moles) maleic anhydride
262.7 gms (1.775 moles) phthalic anhydride
296.8 gms (3.9 moles) propylene glycol
54.0 gms (3.0 moles) water The reaction mass was heated to 90° C. and held at that temperature for about 45 minutes. 144.6 gms (1.05 moles) of a $C_{10}$ hydrocarbon concentrate containing 81% dicyclopentadiene and 95.5% total $C_{10}$ hydrocarbons were added over a 3 minute period. The temperature controller was set at 140° C. The reaction mass refluxed at 130° C. After refluxing for about 2½ hours, the reflux condenser was replaced with a steam condenser, a water cooled condenser and a Dean Stark trap to collect the distillate. The temperature controller was set at 200° C. and the reaction was allowed to proceed until an acid number of 32 was attained for the polyester resin.

100 ppm of hydroquinone was added (based on 40% styrene) when the temperature went down to 150° C. At 100° C., 543 gms of styrene were blended with the polyester.

Control A (Polyester resin prepared without water)

To a reaction flask equipped as above as charged:
147 gms (1.5 moles) maleic anhydride
222 gms (1.5 moles) phthalic anhydride
251 gms (3.3 moles) propylene glycol The reaction mass was heated to 90° C. over a 22 minute period at which point 122 gms (0.90 moles) of a $C_{10}$ hydrocarbon concentrate containing 81% dicyclopentadiene and 95.5% total $C_{10}$ hydrocarbon were added over a six minute period. The controller was set for 140° C. and left in that mode for 2 hours. After an additional hour of heating at 170° C., the reflux condenser was replaced with a steam condenser. The temperature controller was set at 200° C. and the polyesterification process was continued until an acid number of 34 was attained.

Styrene and inhibitor were added in a manner similar to Example 1.

The resin had a maximum exotherm of only 309° F. when catalyzed with 1% benzoyl peroxide and cured at 180° F. in the SPI gel test.

Control B (Polyester resin prepared with maleic acid)

Using substantially same procedures and equipment as in Control A and substituting the same amount of maleic acid for the maleic anhydride, a polyester resin was prepared having an acid number of 34. Styrene and hydroquinone were added as in Example I.

EXAMPLE 2

To a resin flask equipped as described in Example 1 was added:
147 gms (1.5 moles) maleic anhydride
251 gms (3.3 moles) propylene glycol
27 gms (1.5 moles) water.

The reaction mass was heated to 90° C. and held at that temperature for 1 hour. 122 gms (0.90 moles) of a $C_{10}$ hydrocarbon concentrate containing 81% dicyclopentadiene were then added over a 2–3 minute period. 1.5 moles (222 grams) of phthalic anhydride was added when the temperature reached 100° C., 2–5 minutes after setting the temperature controller at 140° C. The controller was then set at 140° C. for a 2 hour period and at 170° C. for about 1 hour.

The reflux condenser was then replaced with apparatus suitable for water removal and the temperature controller set at 200° C. After 9.2 hours total reaction time, an acid number of 30 was attained and the reaction was terminated.

The resin was blended with hydroquinone and styrene as before. The SPI exotherm of 402° F. is superior of Example 1 where water was used but phthalic anhydride was not staged.

EXAMPLE 3

To a reactor equipped as described in Example 1 was added:
147 gms (1.5 moles) maleic anhydride
251 gms (3.3 moles) propylene glycol
9 gms (0.5 moles) water The reaction mass was heated to 90° C. over a 13 minute period. At this point 122 gms (0.90 moles) of a $C_{10}$ hydrocarbon concentrate containing 81% dicyclopentadiene (DCPD) was added over a 2–3 minute period. A heat up to 140° C. was started. 222 gms of phthalic anhydride was added about 5 minutes after the 90° C. temperature was attained or 2–3 minutes after the DCPD was added. After 2 hours at 140° C., the controller was set at 170° C. and held there for 1 hour.

The reflux condenser was removed, replaced with water removal equipment as in the above examples, and the reaction continued until an acid number of 35 was reached for the resin. After blending the resin with hydroquinone and styrene as before, the resin had a maximum exotherm of 378° F. pointing out the beneficial effect of a minimal hydrolysis period and low levels of water.

EXAMPLE 4

To a reactor equipped as described in previous examples was added:
147 gms (1.5 moles) maleic anhydride
251.1 gms (3.3 moles) propylene glycol
18 gms (1.0 moles) water.

The above mass was heated to 55° C. over a one-half hour period (The controller was set at 50° C. so there was a 5° C. exotherm). At the ½ hour point, 122 gms of 81% dicyclopentadiene were added over a 1½ minute period. The controller was set at 140° C. When the temperature reached 100° C. 222 gms (1.5 moles) of phthalic anhydride were added. This reduced the mass temperature to 85° C. but the 140° C. temperature was attained fifteen minutes later. After 37 minutes at 140° C., the reflux condenser was replaced with a Dean Stark trap, the steam condenser was engaged and normal polyesterification techniques employed.

The reaction temperature was set at 200° C. and the resin was cooked to an acid number of 34.

Hydroquinone and styrene were added in the manner described in previous examples to a 40% monomer level.

EXAMPLE 5

To a reactor equipped in a manner described in previous examples was charged:
147 gms (1.5 moles) maleic anhydride
222 gms (1.5 moles) phthalic anhydride
251.1 gms (3.3 moles) propylene glycol
54 gms (3.0 moles) water
122.2 gms (0.90 moles) of 95.5% $C_{10}$ hydrocarbon concentrate.

After 35 minutes of agitation at room temperature, the temperature controller was set at 140° C. The reaction mass was allowed to reflux in the range of 130° C. to 136° C. for 3 hours. A steam condenser and Dean Stark trap was installed, the temperature controller set at 200° C. and a normal polyesterification procedure was allowed to continue to an acid number of 33.

The resin was cooled to 150° C. where 0.046 grams of hydroquinone (100 ppm based on 40% styrene) was added. The reactor mass was further cooled to 100° C., at which point 461 gms of styrene was added.

EXAMPLE 6

To a reactor equipped as described in the previous examples was charged:
8.7 moles (853.1 gms) maleic anhydride
6.0 moles (108 gms) water
and 31 gms of xylene The reactants were heated to 70° C. over a 30 minute period. Over a 5 minute period, 5.25 moles (741.2 gms) of 93.5% $C_{10}$ hydrocarbon concentrate was added. The reaction mass exothermed to 103° C. The temperature control was set at 100° C. The reaction of maleic acid and hydrocarbon was complete in about ½ hour.

A steam condenser and Dean Stark trap were set in place. Then 3.9 moles (577.7 gms) phthalic anhydride and 11.84 moles (901 gms) of propylene glycol were added to the reactor and the normal polyesterification process continued at a temperature of 204° C. to an acid number of 27. During the cooling phase, 0.215 gms of hydroquinone were added.

EXAMPLE 7

To a reactor equipped as described in the previous examples was charged:
1.5 moles (147 gms) maleic anhydride
3.3 moles (251.1 gms) propylene glycol
0.1 moles (1.8 gms) water The reactants were heated to 90° C. over a 15 minute period. Over a 2 minute period, 0.9 moles (121.9 gms) of 97.46% $C_{10}$ hydrocarbon concentrate were added. The temperature controller was set at 140° C. At 100° C., 1.5 moles (222 gms) phthalic anhydride were added to the reactor. Once 140° C. was reached, the reaction mass exothermed to 160° C. After 2 hours at 140° C., the temperature controller was set at 170° C. for 1 hour. A steam condenser and Dean Stark trap were set in place and the polyesterification process continued at a temperature of 200° C. to an acid number of 33. During the cooling phase, 0.045 gms hydroquinone were added.

EXAMPLE 8

To a reactor equipped as described in the previous examples was charged:
1.5 moles (147 gms) maleic anhydride
3.3 moles (251.1 gms) propylene glycol
0.3 moles (5.4 gms) water The reactants were heated to 90° C. over a 15 minute period. Over a 2 minute period, 0.9 moles (121.9 gms) of 97.46% $C_{10}$ hydrocarbon concentrate were added. The temperature controller was set at 140° C. for 2 hours. At 100° C., 1.5 moles (222 gms) phthalic anhydride were added to the reactor. The temperature controller was set at 170° C. for 1 hour. A steam condenser and Dean Stark trap were set in place and the polyesterification process continued at a temperature of 200° C. to an acid number of 34.7. During the cooling phase, 0.0452 gms hydroquinone were added.

The resins prepared in the foregoing examples and their physical properties are summarized in Tables I-V.

TABLE I

| | REACTION CONDITIONS | | |
|---|---|---|---|
| Examples | Water to maleic Anhydride mole ratio | Temp. of Hydrocarbon Add'n | Addition Temp. of Phthalic |
| Control A | none | 90° C. | ambient |
| Control B | None | 90° C. | ambient |
| Example 1 | 1.7:1 | 90° C. | ambient |
| Example 2 | 1:1 | 90° C. | ambient |
| Example 3 | 0.33:1 | 90° C. | 100° C. |
| Example 4 | 0.66:1 | 50° C. | 100° C. |
| Example 5 | 2:1 | ambient | ambient |
| Example 6 | .69:1 | 70° C. | 100° C. |
| Example 7 | 0.066:1 | 90° C. | 100° C. |
| Example 8 | 0.2:1 | 90° C. | 100° C. |

TABLE II

| | REACTION RESULTS | | |
|---|---|---|---|
| Example | Total Reaction Time (Hours) | Acid Number | Hydrocarbon Efficiency (%) |
| Control A | 9.2 | 34 | 92.8 |
| Control B | 10.5 | 34 | 96.7 |
| 1 | 10.0 | 32 | 92.3 |
| 2 | 9.2 | 30 | 98.7 |
| 3 | 9.9 | 34 | 96.3 |
| 4 | 6.2 | 34 | 90.3 |
| 5 | 9.0 | 33 | 93.2 |
| 6 | 13.0 | 27 | 99.1 |
| 7 | 8.4 | 33 | 89.1 |
| 8 | 9.2 | 35 | 97.5 |

TABLE III

| | RESIN PROPERTIES/SPI CURE* | | | | |
|---|---|---|---|---|---|
| Example | Viscosity (cps) 40% Styrene | Gardner Color | Gel time (minutes) | Cure Time (minutes) | Maximum Exotherm (° F.) |
| Control A | 94 | >1, <2 | 5.0 | 9.6 | 309° |
| Control B | 92.5 | 2 | 4.3 | 8.7 | 352 |
| 1 | 82.5 | 1 | 3.8 | 8.2 | 368 |
| 2 | 78.8 | >1, <2 | 2.3 | 8.0 | 402 |
| 3 | 81.6 | >1, <2 | 3.3 | 8.1 | 378 |
| 4 | 89.0 | >1, <2 | 4.9 | 9.2 | 367 |
| 5 | 82.5 | 1 | 3.6 | 8.3 | 343 |
| 6 | 325 (35% Styrene) | N.A. | 3.4 | 5.9 | 397 |
| 7 | 77.5 | N.A. | 4 | 9.54 | 345 |
| 8 | 80 | N.A. | 3.8 | 8.3 | 359 |

*Using 1% benzoyl peroxide as the catalyst.

TABLE IV

| | ROOM TEMPERATURE CURE PROPERTIES* | | | |
|---|---|---|---|---|
| Example | Gel Time (minutes) | Cure Time (minutes) | 10 Min. Temp. (° F.) | Max. Exotherm (° F.) |
| Control A | 8.6 | 22.2 | 91 | 241 |
| Control B | 7.8 | 20.6 | 91 | 270 |
| 1 | 4.1 | 14.2 | 160 | 284 |
| 2 | 6.0 | 15.5 | 150 | 288 |
| 3 | 5.1 | 14.5 | 163 | 291 |
| 4 | 5.2 | 14.5 | 153 | 291 |
| 5 | 4.6 | 14.2 | 171 | 279 |
| 6 | N.A. | N.A. | N.A. | N.A. |
| 7 | N.A. | N.A. | N.A. | N.A. |
| 8 | N.A. | N.A. | N.A. | N.A. |

*Using 1% methyl ethyl ketone peroxide, 0.1% cobalt naphthenate 6%, 0.1% dimethyl aniline as the catalyst

TABLE V

| | PHYSICAL PROPERTIES | | | | |
|---|---|---|---|---|---|
| | Barcol Hardness | | | | Heat Distortion |
| Example | 2 hrs. | 4 hrs. | 1 day | 10 days | Temp. (° C.) |
| Control A | 0 | 0 | 33 | 43 | 54 |
| Control B | 0 | 0 | 28 | — | 62.5 |
| 1 | 0 | 12 | 41 | 54 | 59 |
| 2 | 0 | 12 | 41 | 51 | 63 |
| 3 | 0 | 7 | 33 | 41 | 61.5 |
| 4 | 0 | 7 | 38 | 45 | 61.5 |
| 5 | 0 | 5 | 33 | 42 | 63 |
| 6 | N.A. | N.A. | N.A. | N.A. | 90 |
| 7 | N.A. | N.A. | N.A. | N.A. | 58 |
| 8 | N.A. | N.A. | N.A. | N.A. | 60 |

EXAMPLES 9-14

Glass laminates, containing 25% random fiber glass mat, were prepared using the styrene-resin blends of Examples 1-6. Two fiber glass plys and a normal hand-roller technique were used to make a part about ⅛-inch thick and 12 inches by 14 inches in dimensions from each resin blend.

The catalyst used in each case consisted of 1% methyl ethyl ketone peroxide, 0.1% cobalt naphthenate 6% and 0.02% dimethyl aniline.

The catalyst-resin blends were modified with p-benzoquinone in each instance to give a room temperature gel time in the range from about 15-20 minutes.

The glass laminates were cured at 22°-24° C. and tested after at least 10 days. The properties set forth in Table VI were found.

TABLE VI

| | PHYSICAL PROPERTIES 75% Resin, 25% Glass Mat | | | | | |
|---|---|---|---|---|---|---|
| Examples | Flex Strength (psi) | Flex Modulus (psi × 10³) | Tensile Strength (psi) | Tensile Modulus (psi × 10³) | Percent Elongation | ft. lbs/in Impact |
| Control X (with resin of Control A) | 18,109 | 806.5 | 9,638 | 735.6 | 1.5 | 8.0 |
| Control Y (with resin of Control B) | 18,109 | 806.5 | 9,638 | 735.6 | 1.5 | 8.0 |
| 9 (with resin of Example 1) | 16,164 | 768.4 | 10,698 | 716.6 | 1.7 | 6.2 |
| 10 (with resin of Example 2) | 16,726 | 718.3 | 13,154 | 819.2 | 1.9 | 7.5 |
| 11 (with resin of Example 3) | 17,368 | 794.0 | 10,590 | 605.2 | 2.0 | 6.9 |
| 12 (with resin of Example 4) | 19,734 | 1,005.4 | 10,397 | 980.8 | 1.3 | 6.6 |
| 13 (with resin of Example 5) | 18,331 | 902.2 | 10,349 | 933.2 | 1.3 | 7.2 |
| 14 (with resin of Example 6) | 20,300 | 833.2 | 9,100 | 813.7 | 1.3 | 6.5 |

EXAMPLE 15

In a manner similar to Example 1, 3 moles of maleic anhydride, 1 mole of a $C_{10}$ hydrocarbon concentrate containing 81% dicyclopentadiene, and one mole of water is reacted for about two hours at 100° C. Phthalic anhydride (3 moles) is then added to the reaction mixture along with 2.2 grams of sodium hydroxide. Propylene oxide is then added to the reaction mixture at a rate to maintain the temperature in the range 130°-150° C. until an acid value of 40-80 is obtained.

The reaction mixture is then heated to 190° C. for one hour, cooled, blended with styrene and used to make glass laminates as set forth in the foregoing examples.

EXAMPLE 16

To a reaction flask equipped with a stirrer, thermowell, nitrogen sparge tube and a relux condenser were added:

266.0 gms (1.8 moles) phthalic anhydride
230.2 gms (2.5 moles) glycerine
36.0 gms (2 moles) water The reaction mass was heated to 100° C. and held at that temperature for 1 hour. The temperature controller was set at 90° C. and at that temperature 51 gms of 97.46% dicyclopentadiene concentrate was added over a 2 minute period. The temperature controller was set at 130° C. After 2½ hours at 130° C., the reflux condenser was replaced with a steam condenser, a water cooled condenser and a Dean Stark trap to collect the distillate. Also at this point 357 gms (1.275 moles) of linoleic acid were added to the reaction mass. The reaction temperature was set at 180° C. for 1 hour. After that hour the temperature controller was set at 195° C. and the alkyd was allowed to proceed until an acid number of 8 was attained. The temperature controller was set back to 180° C. At that temperature 119 gms (0.62 mole) of trimellitic anhydride were added. The reaction temperature was set at 175° C. and the alkyd allowed to procedd to an acid number of 55.

320 gms of ethylene glycol n-butyl ether (Dowanol EB) was added at 110° C. to blend in with the alkyd.

The alkyd had a 200° C. cure of less than 15 minutes. The hydrocarbon efficiency was 91.1%.

Suitable enamel paints can be made by adding ingredients such as titanium dioxide, antiskining agents, and accelerators.

EXAMPLE 17

To a reaction flask equipped with a stirrer, thermowell, nitrogen sparge tube and a reflux condenser were added:

174.1 gms (1.5 moles) maleic acid
249.2 gms (1.5 moles) o-phthalic acid
251.1 gms (3.3 moles) propylene glycol
36.0 gms (2.0 moles) water The reaction mass was heated rapidly to 90° C. under agitation. 123.75 gms (0.9 moles, of a $C_{10}$ hydrocarbon concentrate (96% reactive) were added over a 3 minute period. The temperature controller was set at 140° C. The reaction mass refluxed at 127° C. After about 2 hours of refluxing the temperature controller was set at 170° C. for ¾ hour. The reflux condenser was replaced with a steam condenser, a water cooled condenser and a Dean Stark trap to collect the distillate. The reaction temperature was set at 200° C. and the resin was allowed to proceed until an acid number of 34.6 was attained.

100 ppm of hydroquinone was added (based on 40% styrene) when the temperature went down to 150° C. At 100° C., 447 gms of styrene were blended with the polyester.

| Reaction Results | |
|---|---|
| 1. Reaction Time | 10.73 hours. |
| 2. Acid Number | 34.6 |
| 3. Hydrocarbon Effic. | 87.95% |
| 4. Viscosity | 68 cps. |
| *5. Room Temp. Gel. | 6 min. |

| Reaction Results | |
|---|---|
| *6. Room Temp. Cure - | |
| - cure time | 13.66 min. |
| - 10 min. temp. | 180.5° F. |
| - max. exotherm | 294.8° F. |
| **7. SPI 180° F. Test | |
| - gel time | 3.46 min. |
| - cure time | 7.84 min. |
| - max. exotherm | 363.2° F. |
| 8. Gardner Color | 1 |
| 9. Heat Distortion Temp. | 71° C. |

*Room Temp. cure system:
 0.1% cobalt naphthenate 6% (10% solution)
 0.1% dimethyl aniline
 1% methyl ethyl ketone perioxide
**SPI 180° F. cure system
 1% benzoyl peroxide.

The foregoing example illustrates the beneficial results of adding water to a system wherein the dicarboxylic acid anhydrides are replaced with dicarboxylic acids. It is to be noted that the maximum exotherm of the room temperature cure and the S.P.I. cure, and the heat distortion temperature are improved over example 2 and control B.

I claim:

1. The resin produced by reacting a mixture comprising
   (A) a reactant selected from the group consisting of
      (1) an alpha, beta ethylenically unsaturated dicarboxylic acid, anhydride thereof, or mixtures thereof,
      (2) a saturated polycarboxylic acid or the anhydride thereof,
      (3) mixtures of (1) and (2),
   (B) about 0.03 to about 10 moles water per mole of carboxylic acid or anhydride;
   (C) about 0.05 mole to about 1.0 mole of a $C_{10}$ hydrocarbon concentrate per mole of carboxylic acid or anhydride, and
   (D) a polyol or an alkylene oxide, with the proviso that when (D) is an alkylene oxide of 2-4 carbons, (A) is at least 90% by weight of a dicarboxylic acid anhydride, and when (D) is a polyol and (A) is a polycarboxylic acid or anhydride, there is present 0-25% by weight based on the total weight of polycarboxylic acid or anhydride of
   (E) a monohydric alcohol having 3-18 carbon atoms,
   (F) a fatty acid or oil having up to 22 carbon atoms,
   (G) a monocarboxylic aromatic acid, or
   (H) mixtures of (E), (F) or (G).

2. The unsaturated polyester produced by reacting a mixture comprising
   (A) a reactant selected from the group consisting of
      (1) an alpha, beta ethylenically unsaturated dicarboxylic acid anhydride,
      (2) mixtures of (1) with 1-90% by weight of a saturated polycarboxylic acid or the anhydride thereof,
      (3) mixtures of (1) with a mixture of a saturated polycarboxylic acid and an anhydride of a saturated polycarboxylic acid,
   (B) about 0.03 to about 10 moles water per mole of carboxylic acid or anhydride,
   (C) about 0.05 mole to about 1.0 mole of a $C_{10}$ hydrocarbon concentrate per mole of carboxylic acid anhydride, and
   (D) a polyol.

3. The resin of claim 1 wherein the mole ratio range of water to carboxylic acid or anhydride is in the range from 0.05:1 to 3:1.

4. The polyester of claim 2 wherein the mole ratio range of water to carboxylic acid or anhydride is in the range from 0.05:1 to 3:1.

5. The polyester resin of claim 2 blended with a liquid ethylenically unsaturated monomer.

6. The polyester blend of claim 5 wherein the weight ratio of polyester resin to monomer is in the range from about 4:1 to about 1:2.

7. A cured fibrous laminate made from the blend of claim 6.

8. A cured fibrous laminate made from the blend of claim 5.